United States Patent [19]

He

[11] Patent Number: 5,437,883
[45] Date of Patent: Aug. 1, 1995

[54] METHOD OF PROCESSING PIG INTESTINES AND STOMACHS

[76] Inventor: Jueling He, 60 Baruch Dr., Apt. 12D, New York, N.Y. 10002

[21] Appl. No.: 279,399

[22] Filed: Jul. 25, 1994

[51] Int. Cl.⁶ ............................................. A23L 1/312
[52] U.S. Cl. .................................. 426/254; 426/509; 426/641; 426/645
[58] Field of Search ............... 426/253, 257, 509, 641, 426/645, 254, 256, 258

[56] References Cited

U.S. PATENT DOCUMENTS 3,346,401 10/1967 Barat ............................. 426/254 X

FOREIGN PATENT DOCUMENTS

| | | | |
|---|---|---|---|
| 49-48746 | 12/1974 | Japan | 426/641 |
| 62-138166 | 6/1987 | Japan | 426/641 |
| 1145983 | 3/1985 | U.S.S.R. | 426/645 |
| 05709 | 4/1992 | WIPO | 426/641 |

*Primary Examiner*—Arthur L. Corbin
*Attorney, Agent, or Firm*—Lilling & Lilling

[57] ABSTRACT

This process is used to prepare pig meat, including pig stomachs and pig intestines. The process includes the steps of thawing, cooking, washing, and refrigeration. Frozen pig meat is first thawed. The meat is then slow cooked in 195 degree F. water for a certain period after which the cooking process is stopped. The meat is then washed in a granular sodium hydroxide solution, rinsed and then soaked in an oxygen bleach solution and rinsed again. The meat is then refrigerated for sale.

10 Claims, No Drawings

METHOD OF PROCESSING PIG INTESTINES AND STOMACHS

FIELD OF THE INVENTION

This invention relates to the food processing industry and, in particular, it relates to the processing of pig stomachs and intestines for edible consumption.

BACKGROUND OF THE INVENTION

Especially among oriental people, pig stomachs and intestines are considered a delicacy. In the prior art, there is a problem in removing the odor without destroying the crispy sensation and the taste. The instant invention is successful in achieving this sensitive balance.

SUMMARY OF THE INVENTION

This method is for processing pig stomachs and pig intestines. The process includes the steps of thawing, cooking, washing, and refrigeration. Generally, pig stomachs and intestines are sold frozen so they must first be thawed. After thawing, pig stomachs are cooked slowly in 212 degree F. water for 20 minutes. Intestines, after thawing, are put in pre-boiled water for 15 minutes. After cooking, the meat is washed in a granular sodium hydroxide solution and then soaked in an oxygen bleach solution. The meat is then rinsed and refrigerated for sale.

DETAILED DESCRIPTION OF THE INVENTION

Pigs stomachs and pig intestines both come frozen. The first step of the process is to thaw the meat. This is typically accomplished by placing the meat in a stainless steel cooking pot in the refrigerator at 40 degrees F. for 24 hours, removing the meat and running cold water over it in a sink. In the case of pig stomach, the meat would then be placed in a stainless steel pot with water just covering the meat by about an inch. After the water is permitted to boil, the heat is lowered and the meat is cooked slowly for 20 minutes. The pig stomachs are then processed in accordance with the methods below.

In the case of pig intestine, there are two methods for slow cooking; Method A and Method B. With Method A for slow cooking pig intestines, the water would be preheated to 212 degrees F. and then the intestine would be placed in the pot with the water just covering the intestine by about an inch. It would then be soaked for 15 minutes without any flames or outside heat and then processed in accordance with the methods below.

With Method B, before cooking, the pig intestines are first prepared by (1) removing all exterior material with a cutting knife, and (2) cutting-open the intestine wall, once, along the length of the intestine using a pair of scissors. The end of one blade of the scissors may be ball-shaped and the end of the other blade may be pointed. The pig intestines are then cooked in accordance with Method A and processed in accordance with the methods below.

In the case of pig stomach or pig intestine (either Method) the hot water would then be drained and the pig meat would be washed in running water for fifteen minutes.

In the case of pig stomach, a knife would be used to slice the stomach to appropriate sizes, typically about 2½ inches long by about 1¼ inch wide and, in the case of pig intestines processed by Method A, cut into 2 inch-long pieces. Pig intestines processed by Method B are not cut at this point.

The pig meat would then be placed in a solution mixed with granular sodium hydroxide dissolved in 120 degree F. water in order to remove dirt, oil and fat. A product called tripe wash 2-P is sold by Birko Corporation of Denver, Colo. and is quite suitable for this purpose. For every thirty lbs. of drained pig meat, about 3–5 ounces of the granular sodium hydroxide would be used. The pig meat would be permitted to soak in a solution of the granular sodium hydroxide and 120 degree F. water for about 30 to 40 minutes. The granular sodium hydroxide solution is then drained and the pig meat is rinsed in cold running water for 5 minutes. The pig meat is then soaked in an oxygen bleach solution for 30 minutes if pig stomachs, 50 to 70 minutes if intestines processed by Method A, or 100–120 minutes if intestines processed by Method B. A product called Acto-140 also sold by Birko Corporation is suitable for this purpose. For every thirty lbs. of drained pig meat, about 6–10 ounces of the oxygen bleach would be used. After soaking, the oxygen bleach is drained. The pig meat would then be run under cold water for two hours and then refrigerated for about two hours at 40 degrees f. At that point, the pig meat would be ready for refrigeration, packaging, serving or other cooking.

I claim:

1. A method for processing frozen pig stomach and intestines comprising the steps of:

thawing frozen pig stomach meat and intestine meat;
    slow cooking the meat in preheated water;
    stopping the cooking of the meat;
    soaking the meat in a granular sodium hydroxide solution for 30 to 40 minutes;
    draining the sodium hydroxide solution from the meat;
    rinsing the meat in cold running water for 5 minutes;
    soaking the meat in an oxygen bleach solution;
    draining the oxygen bleach solution from the meat;
    rinsing the meat in cold water for 2 hours; and then
    refrigerating the meat for 2 hours at 40 degrees F.

2. A method as claimed in claim 1 wherein the step of slow cooking the pig stomach meat further comprises the steps of:

placing pig stomachs in a cooking vessel and adding water;
    ensuring that 1 inch of the water covers the pig stomachs;
    bringing the water to a boil;
    lowering the water temperature to 195 degrees F.; and
    cooking for 20 minutes.

3. A method as claimed in claim 1 wherein the step of slow cooking the pig intestine meat further comprises the steps of:

preheating water in a cooking vessel to 212 degrees F.;
    adding pig intestines to the vessel ensuring that 1 inch of the preheated water covers the pig intestines; and
    cooking for 15 minutes without any additional heat.

4. A method as claimed in claim 3 wherein the step of soaking the pig intestine meat in an oxygen bleach solution further comprises the steps of:

covering the pig intestine meat by 1 inch with a solution composed of 100 degree F. water and 6–10 ounces of oxygen bleach for every 30 lbs of pig intestine meat for a period of 50 to 70 minutes.

5. A method as claimed in claim 1 wherein the step of slow cooking the pig intestine meat further comprises the steps of:
removing all exterior material from the pig intestines cutting the intestine wall once down the length of the intestine;
preheating water in a cooking vessel to 212 degrees F.;
adding pig intestines to the vessel ensuring that 1 inch of the preheated water covers the pig intestines; and then
cooking for 15 minutes without any additional heat.

6. A method as claimed in claim 5 wherein the step of cutting the intestine wall further comprises the step of:
cutting the intestine wall with a pair of scissors with an end of at least one blade of said scissors being ball-shaped.

7. A method as claimed in claim 5 wherein the step of soaking the meat in an oxygen bleach solution further comprises the steps of:
covering the pig meat by 1 inch with a solution composed of 100 degree F. water and 6-10 ounces of oxygen bleach for every 30 lbs of drained meat for a period of 100 to 120 minutes for pig intestines.

8. A method as claimed in claim 1 wherein the step of soaking the meat in a granular sodium hydroxide solution further comprises the steps of:
covering the pig meat by 1 inch with a solution composed of 100 degree F. water and 3-5 ounces of granular sodium hydroxide for every 30 lbs of meat.

9. A method as claimed in claim 1 wherein the step of soaking the meat in an oxygen bleach solution further comprises the steps of:
covering the pig meat by 1 inch with a solution composed of 100 degree F. water and 6-10 ounces of oxygen bleach for every 30 lbs of meat for a period of 30 minutes for pig stomach meat or 50 to 70 minutes for pig intestine meat.

10. A method as claimed in claim 1 wherein the processing of pig stomachs further comprises the step of apportioning the stomachs to sizes of 2.5 inches long by 1.25 inches wide prior to soaking the stomach meat in the granular sodium hydroxide solution.

* * * * *